(No Model.)

6 Sheets—Sheet 1.

F. F. RAYMOND, 2D.
NAILING MACHINE.

No. 342,039. Patented May 18, 1886.

WITNESSES:
INVENTOR

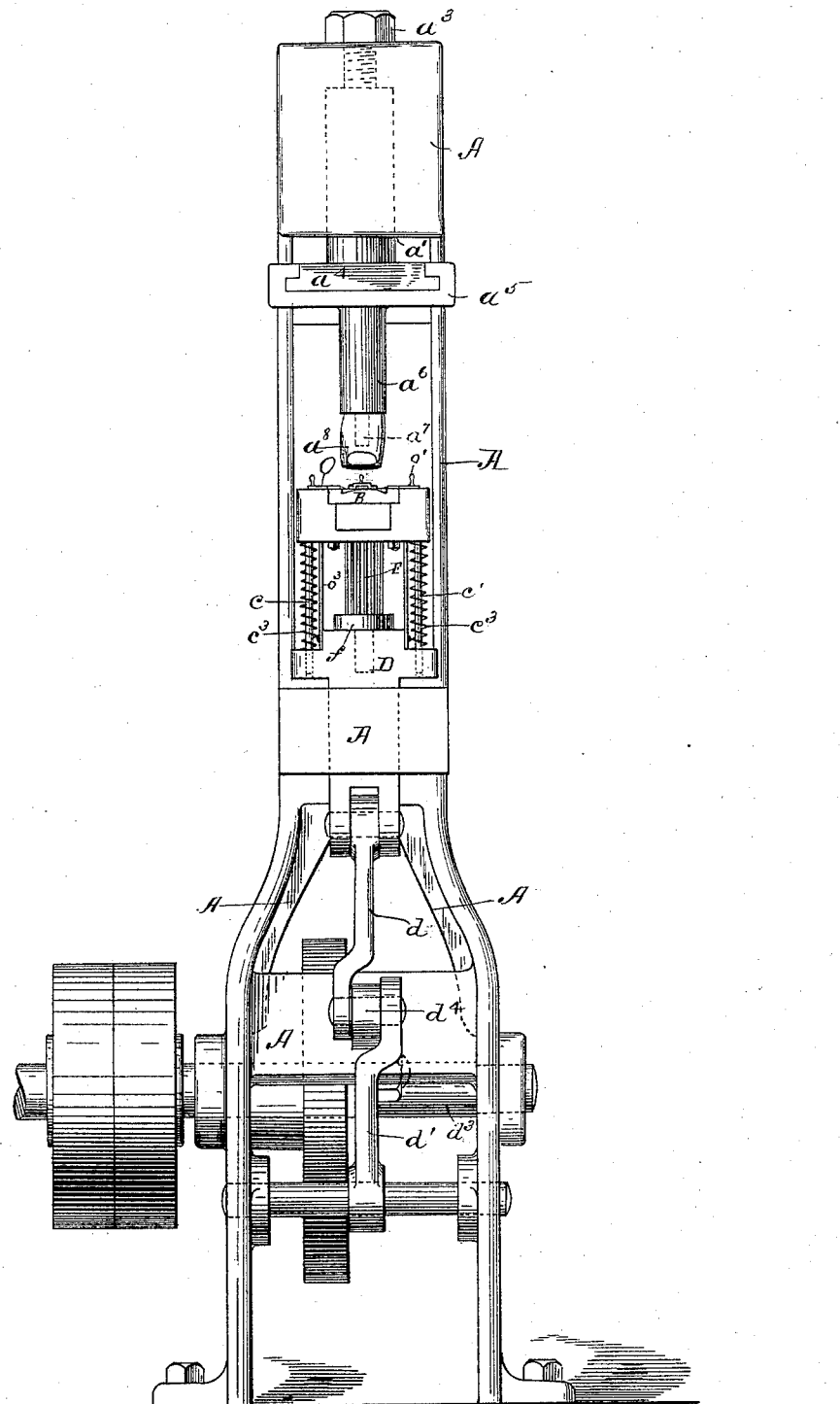

(No Model.)
6 Sheets—Sheet 3.

F. F. RAYMOND, 2D.
NAILING MACHINE.

No. 342,039. Patented May 18, 1886.

WITNESSES:
J. M. Dolan
Fred. B. Dolan

INVENTOR:
F. F. Raymond (No Model.)  6 Sheets—Sheet 4.

F. F. RAYMOND, 2D.
NAILING MACHINE.

No. 342,039. Patented May 18, 1886.

WITNESSES:
J. M. Dolan.
Fred. B. Dolan.

INVENTOR:
F. F. Raymond (No Model.)  6 Sheets—Sheet 5.

F. F. RAYMOND, 2D.
NAILING MACHINE.

No. 342,039.  Patented May 18, 1886.

WITNESSES:
J. M. Dolan.
Fredk. B. Dolan

INVENTOR:
F. F. Raymond 2d

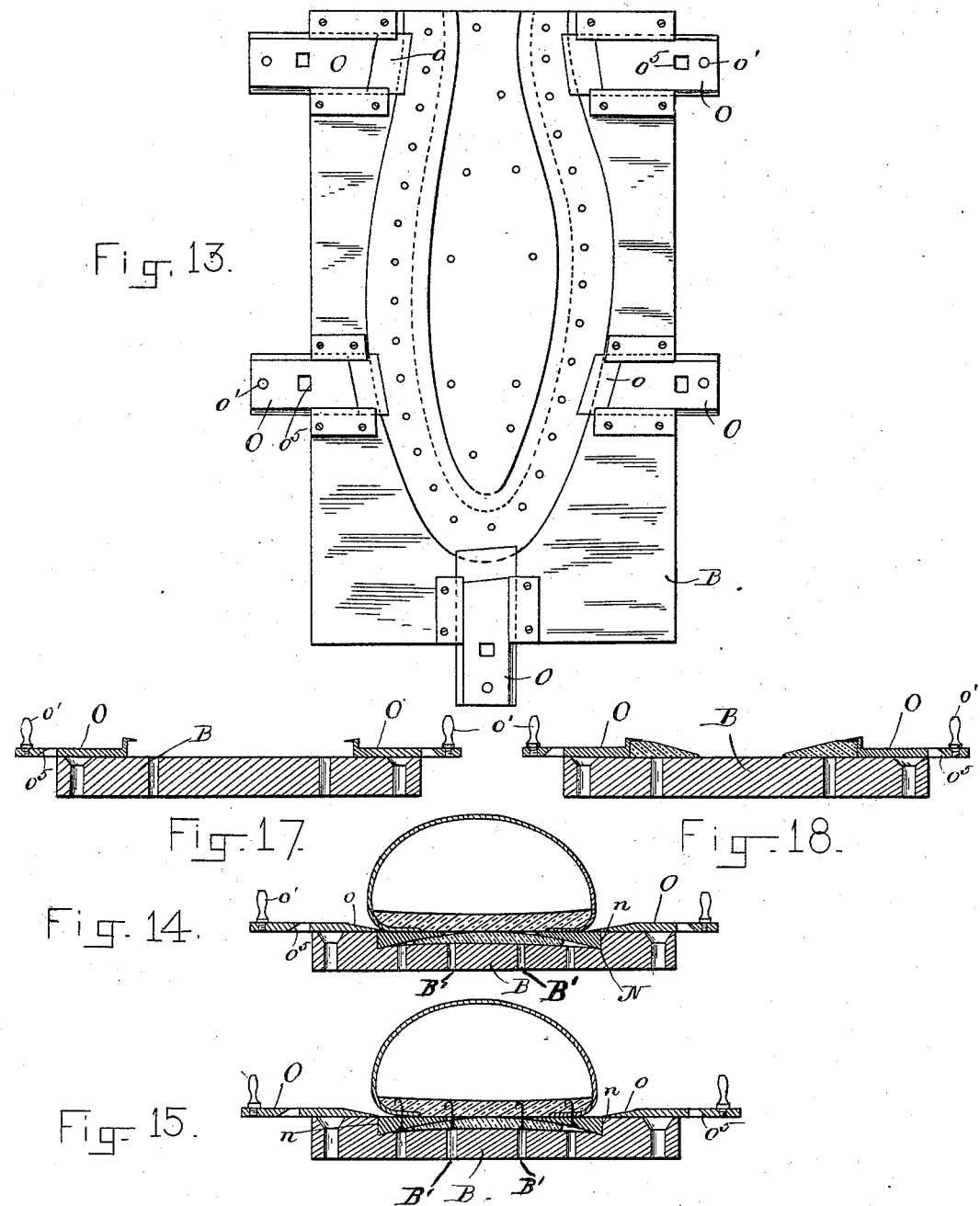

UNITED STATES PATENT OFFICE.

FREEBORN F. RAYMOND, 2D, OF NEWTON, MASSACHUSETTS.

NAILING-MACHINE.

SPECIFICATION forming part of Letters Patent No. 342,039, dated May 18, 1886.

Application filed January 30, 1886. Serial No. 190,273. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nailing-Machines, of which the following is a full, clear, and exact description, reference being had to the accompanying drawings, forming a part of this specification, in explaining its nature.

The invention relates especially to a machine for nailing welts to the upper and insole of boots and shoes and of rands to the outsole. It may also be used for nailing spring-heels and heel-seats and for securing heels to the out and in sole. It comprises an adjustable support or jack for the boot or shoe, a templet having a cavity or recess in its surface adapted to receive a welt or rand, slides for holding the welt or rand in place therein, a nail-feeding plate arranged to slide or be moved below the templet, and means for supplying the nail-feeding plate with nails, and a reciprocating gang of drivers.

Figure 1:
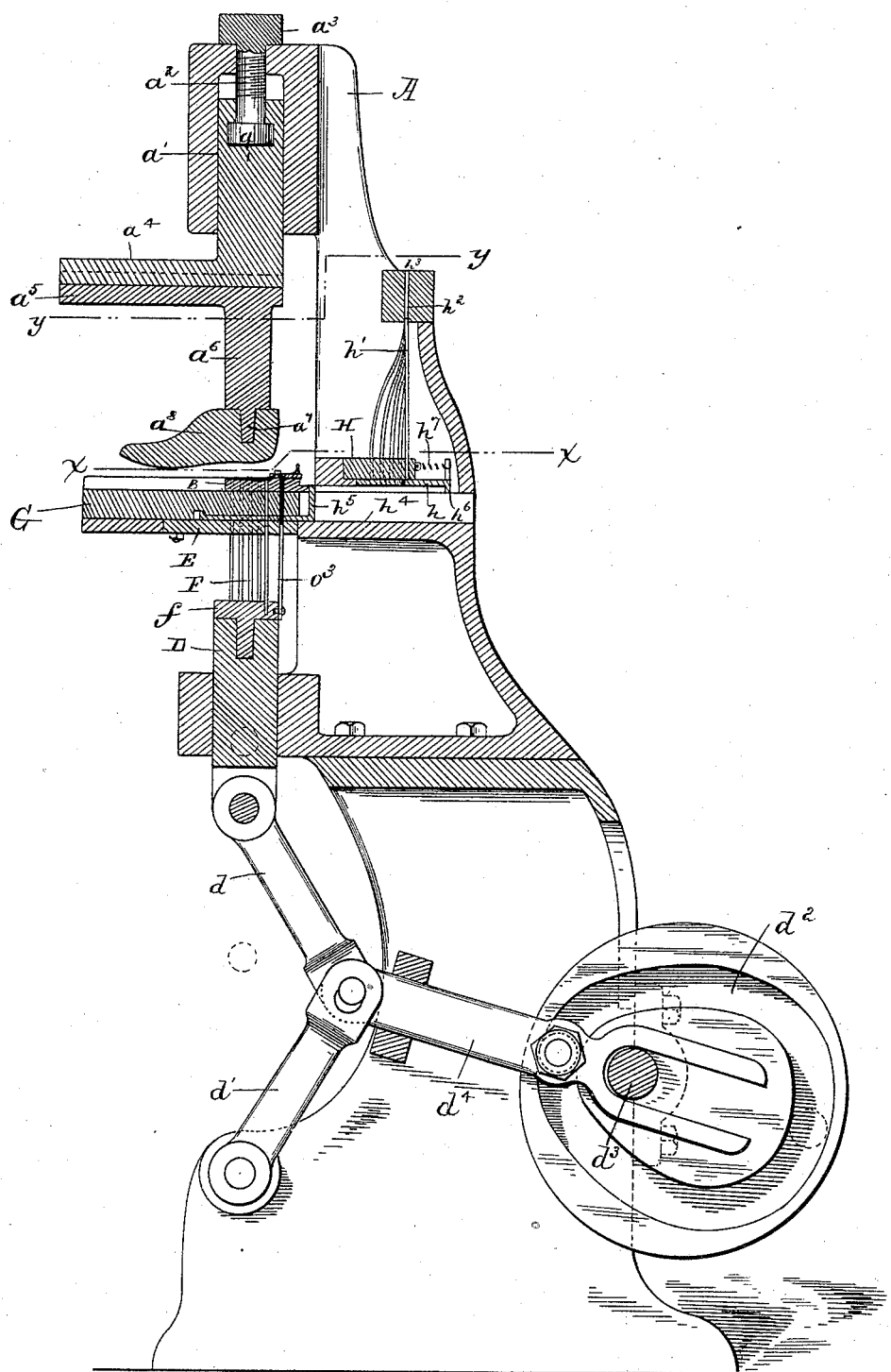
Figure 16:
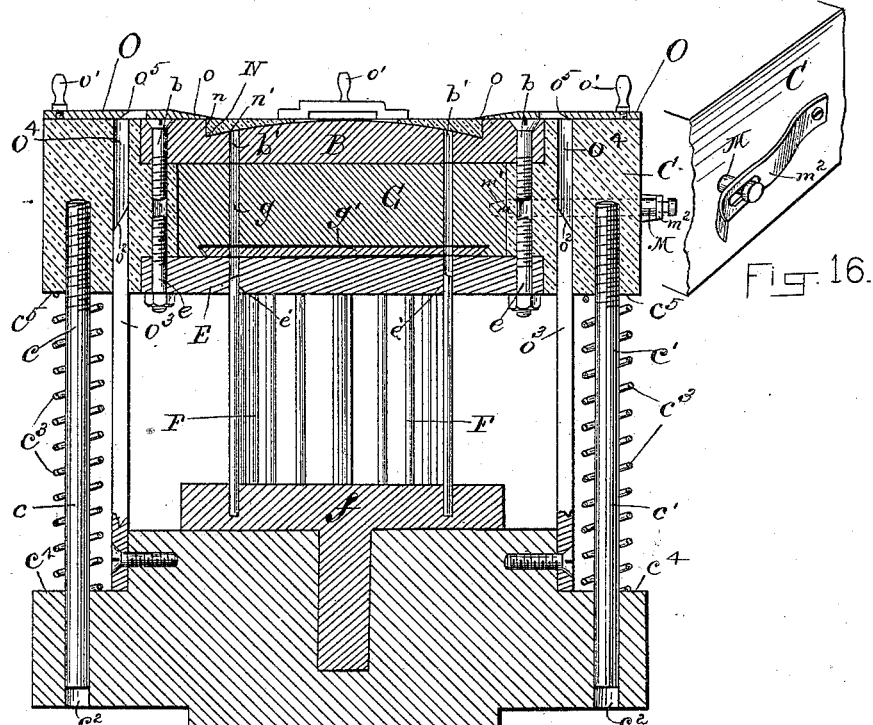
Figure 3:
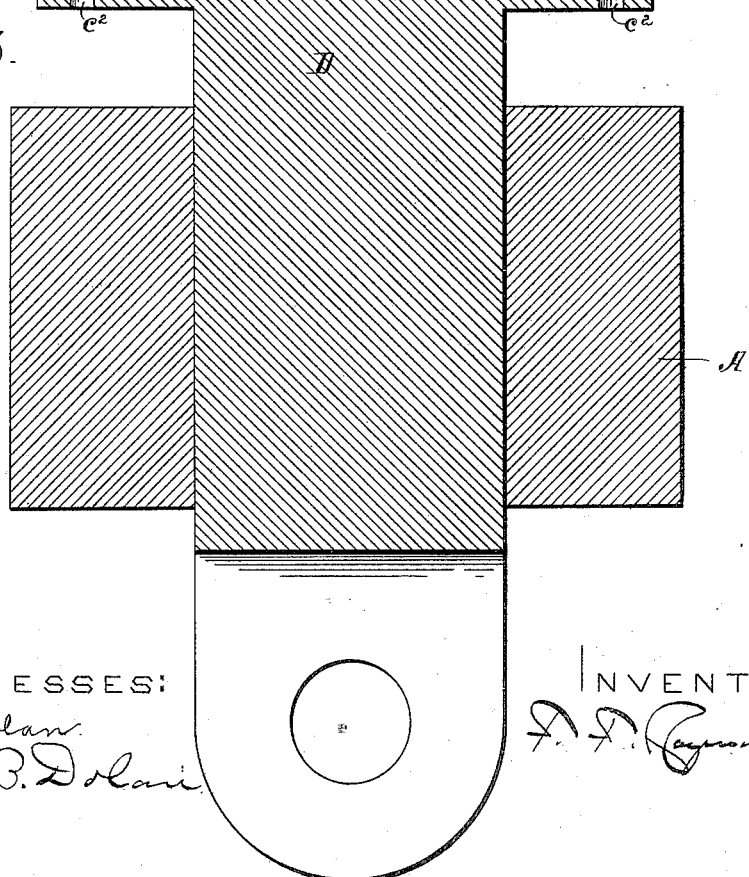
Figure 4:
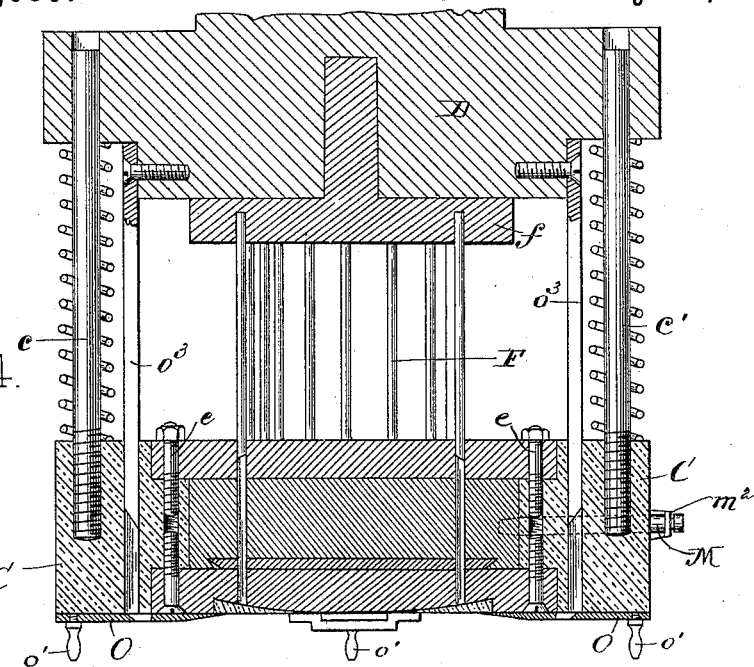
Figure 5:
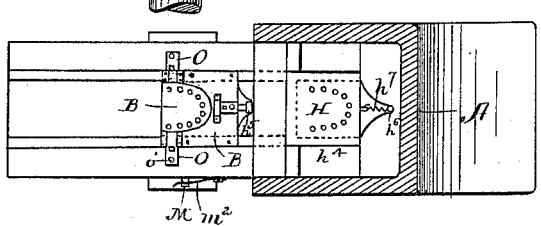
Figure 6:
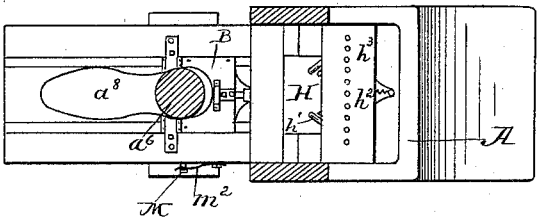
Figure 7:
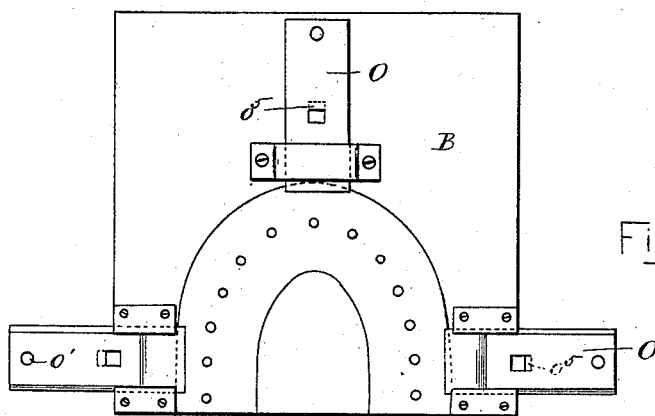
Figure 8:
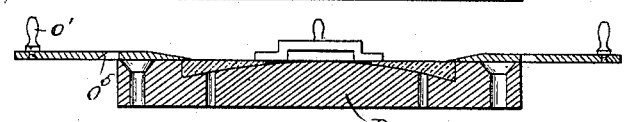
Figure 11:
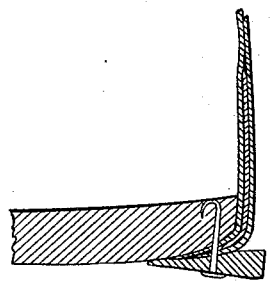
Figure 9:
Figure 12:
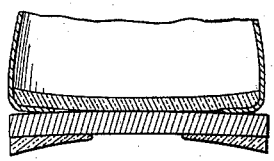
Figure 10:
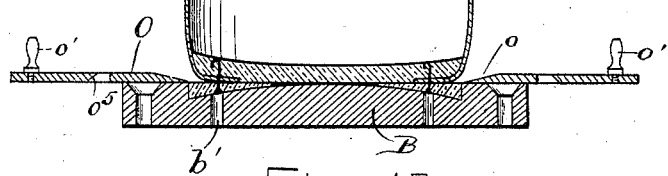

Referring to the drawings, Figure 1 is a vertical central section of a machine containing the features of my invention. Fig. 2 is a front elevation thereof. Fig. 3 is a view in vertical section enlarged of the templet, nail-carrier, their holding block or support, drivers, and a reciprocating head, to which they are attached. Fig. 4 represents a modification, to which reference is hereinafter made. Fig. 5 is a section upon and in plan below the dotted line $y\,y$ of Fig. 1. Fig. 6 is a section upon and in plan below the dotted line $x\,x$ of Fig. 1. Fig. 7 is a view in plan enlarged of a templet having a welt or rand holding recess and welt or rand holding slides or plates. Fig. 8 is a vertical central section thereof, representing a welt in place in the welt or rand holding recess and the slides or plates moved thereon. Fig. 9 shows the position of the templet, the welt or rand sliding plates, and the boot or shoe after the movement of the templet to bring the welt into contact with the soles of the boot or shoe. Fig. 10 represents the same parts after the fastenings have been driven and the slides or plates withdrawn. Fig. 11 is an enlarged view in section containing the welt attached to the upper and insole. Fig. 12 is a section of a shoe, showing a rand attached to the outsole. Fig. 13 is a plan view of a templet having a welt-holding recess and welt slides or plates, and also provided with the recess or space for the reception of the filling ordinarily used within the inner edge of a welt, to fill the space between the inner surface of the insole and inner surface of the outsole. Fig. 14 is a view in section representing the templet thus shaped, the welt and filling in position held therein by the slides and in contact with the insole and upper of a boot or shoe preparatory to nailing the same. Fig. 15 represents the same parts, the welt and filling being represented as secured or attached to the insole and the sides as withdrawn. Fig. 16 is a detail view in perspective illustrating a portion of the construction of a spring pin or latch for locking the nail-carrier plate, to which reference is hereinafter made. Figs. 17 and 18 show a modification.

A is the frame of the machine. It supports a slide or block, $a$, which is adapted to vertically move in the ways $a'$ by means of the screw $a^2$ and nut or hand-wheel $a^3$, or other equivalent mechanism. The slide-block has a horizontally-extending plate, $a^4$, which supports a horizontally-sliding plate, $a^5$, and this plate carries a post, $a^6$, having one or more pins, $a^7$, for supporting a last, $a^8$. This construction provides means for the vertical adjustment of the boot or shoe in relation to the nailing mechanism, and also a way of quickly placing the last upon the jack.

B is the templet-block. It is represented in Fig. 3 as secured by the screws $b$ to the frame or support C. This frame or support C has downward-extending rods or guides $c\,c'$, which enter holes $c^2$ in the head D, and the support or frame C is maintained in an elevated position above the head D by the springs $c^3$, which surround the rods and bear against the surface $c^4$ of the head D and the under surface, $c^5$, of the frame or support C. The frame or support C also has a plate, E, which is secured to the frame or support C by screw-studs $e$, or in any other desired way. This plate has holes $e'$, which correspond in number and location with the holes $b'$ of the templet-plate and with the drivers F. The drivers F are reciprocated by the driver-holder block $f$, which is fastened to the upper surface of the reciprocating head D, and when the head is in its lowest position the upper ends of the drivers extend into the holes $e'$ and plate E. Between the plate E and the plate B there is arranged a sliding nail-carrier plate, G, which has holes $g$, corresponding in size and arrangement with the holes $e'$ of the plate E and $b'$ of the templet-plate B. The plate G also has a perforated sliding hole-covering plate, $g'$, operated to uncover the holes of said plate, as hereinafter described. The drivers are reciprocated by means of the head D, the toggle $d$ $d'$, the cam $d^2$ on the main shaft $d^3$, and the connecting slide block or link $d^4$. A crank or eccentric may be used in lieu of the cam, if desired.

Behind the templet and upon a line therewith is a nail-holding block, H, which has a sliding perforated bottom, $h$. This block and its plate have holes corresponding in arrangement with the holes of the nail-carrier, and the block is adapted to be charged with nails either by an attendant or automatically, and I have represented its nail-receiving holes in the drawings as connected by the tubes $h'$ with the block $h^2$, having a straight line of nail-receiving holes, $h^3$, arranged to open into the tubes, through which nails may be fed by hand or automatically, as described in my various patents and pending applications.

To supply the machine with nails, the block H is first charged with them and the operator moves the nail-carrying plate G backward when the head D is in its lowest position, and the nail-carrier plate rides upon the surface or plate $h^4$, arranged below the nail-holder H to receive it until part $h^5$ comes in contact with the downward extension $h^6$ of the sliding perforated plate $h$, and moves it sufficiently to uncover the holes in the block H, when its holes $g$ will be in line with said holes of the block H, and will receive the nails therefrom. It is then moved forward, and the spring $h^7$ moves the sliding perforated plate $h^6$ back again to close the holes in the block H. Upon the movement of the carrier-block back into position over the plate E and beneath the templet B, the upward-projecting end $h^5$ of the hole-covering plate $g'$ comes in contact with the rear edge of the plate B, and of course it is held while the nail-carrying plate G is drawn or moved forward sufficiently to bring its holes in line with the holes $e'$, and the nail-carrying plate is then automatically latched in that position by means of the spring-pin M, the conical end $m$ of which enters the conical hole $m'$ in the side of the plate, the pin being forced inward by a spring-plate, $m^2$, which also forms an arm or device, by which a pin is disengaged from the hole when it is desired to move the nail-carrier backward. (See Fig. 16.) Upon the backward movement of the nail-carrier the plate $g'$ is moved by the step $h^6$ to automatically cover the holes in the carrier before the holes of the nail-holder block H are uncovered to discharge its contents.

For nailing rands or welts the templet is provided with a cavity or shoulder and surface adapted to receive and hold the rand or welt and apply it in proper form to the outsole or to the upper and insole, and in the figures I have represented the templet as having a cavity or recess, N, having the vertical side $n$ and the inclined surface $n'$. This recess extends about or around the templet in the form or arrangement with which it is desired to secure the rand or welt in place, and the holes $b'$, through which the fastenings are driven, are arranged in relation to the vertical edge $n$ so as to properly locate the fastenings used in securing them in place with proper relation to their edge and to the outsole or upper and insole, as the case may be. Of course the shape of this recess N varies according to the width of the rand or welt, and to the size of the boot or shoe to which either of them may be secured, to its thickness, and whether it be rand or welt, and also to the level which it is desired they shall bear to the outsole or insole after they have been attached.

In securing a rand or welt, I prefer to place it within the recess N of the templet, and to then secure it to the outsole or to the upper and insole of the boot or shoe placed upon the last or work-support, although it may, of course, be secured temporarily to the outsole or upper and insole of the boot or shoe before it has been placed in the machine. The first-named method of applying it, however, I deem better, because the rand or welt is easily and quickly placed in the recess N, and in a shape or form which it is desirable that it shall have after attachment to the outsole or upper and insole, and by so doing it is more quickly and cheaply applied, and better shaped than if first secured to the boot or shoe.

To hold the rand or welt in place after it has been put in the recess N, I have arranged a number of holders or slides, O, which are secured to the frame or support C, to be moved into position by hand upon the surface of the rand or welt to hold it in place. These holders or slides preferably have thin working edges or ends $o$, and they are secured in dovetail or other shaped recesses in the upper surface of the support C, or are held thereto by cap-plates, or secured thereto in any other way, and each have a knob, $o'$, by which they are pushed into place by the operator. They are moved preferably automatically out of position after the templet has been moved so as to bring the welt or rand into forcible contact with the outsole or upper and insole by means of the wedge or inclined surface $o^2$ upon the upper ends of the rods or bars $o^3$. These rods or bars are carried by the head D, and extend upward into the holes $o^4$ in the block or support C, and upon the application of the rand or welt to the insole or upper and insole and after the templet comes to rest by the continued movement of the head D, they are moved upward in the holes $o^4$ until their ends come in contact with the inclined surface $o^5$ of the plate O, when the plates O are moved backward from the recess N, or from between the surface of the rand or welt and the outsole or upper and insole, and this backward movement or withdrawal of these plates is immediately followed by the driving of the fastenings into the rand and outsole or welt and upper and insole, as the case may be. The backward movement or withdrawal of these holding plates or slides O, at the time indicated, serves two purposes: First, it enables the welt or rand to be compressed and uniformly attached; and, second, it permits the templet to resume its original position after the nailing.

In Fig. 7 I represent a rand secured to the templet and in position for attachment to the outsole of a boot or shoe; and in Figs. 8 and 9 I show a welt secured by the slides to the templet and in position for attachment to the upper and insole of a boot or shoe.

In Fig. 9 I have represented the position which the templet, welt, and welt-holding slides, the boot or shoe, and its last or support occupy after the templet has been moved to bring the welt in contact with the sole and after the welt-holding slides have been withdrawn, but before the attaching-nails have been driven. In Fig. 10 I have shown the same parts after the slides are withdrawn and the fastenings driven; and in Figs. 13, 14, and 15 I have represented the templet as provided with a nailing-surface not only adapted to attach or secure a welt, but also the filling or stock which is ordinarily placed upon the surface of the insole within the edge of the welt to build up or fill in the space which would otherwise exist between the upper inner surface of the outsole and the inner surface of the insole; and when the templet is thus shaped it is provided with additional holes B', through which fastenings for attaching this filling to the insole are driven. When this form of templet is used, it is of course necessary that the nail-carrier have holes to correspond, and that the driver-holding plate be provided with suitably-located drivers. It is obvious that this form of templet for nailing or attaching rands and welts may be used whether the attaching-nails be driven upward or downward; and in Fig. 4 I have shown a modification representing the form of templet and slides when the nails or fastenings are adapted to be driven downward. For most uses I prefer, however, that the nails or fastenings be driven upward, as the cavity or recess in the templet N is then so exposed that the rand or welt can be held easily and accurately placed. Of course where the welt or rand is first secured to the boot or shoe it will not be necessary to use the slides and it will be desirable to cut away or extend backwardly or upward the edge $n$ of the recess N. For securing the rand or welt in place it will be desirable to use a headed fastening, and I prefer one of sufficient length to extend through the stock and clinch upon the other side. I would here state that these devices can also be used for driving a gang or group of fastenings into and through the edge of a lasted upper into the insole after the same has been temporarily secured to the insole in the lasting process.

The rand or welt, instead of being attached to the boot or shoe as herein indicated, may be first nailed to the outsole—that is, before the outsole is secured to the upper and insole—in which case the outsole will have a rand or welt secured to it before it is united with the welt or rand to the upper and insole.

It is desirable that the front ends of the recess N be open or extend forward to provide sufficient room for the placing of the welt or rand, or, in other words, so as not to require that the welts or rands be of a given length in order to fit them to the recess, and I have represented such construction in the drawings.

Where thin welts or rands are used it will not be necessary to provide the templet with as deep a recess as shown, and where a very thin welt or rand is used the recess may be dispensed with entirely; but when this is done I prefer to use a form of slide such as is represented in Figs. 17 and 18, and having a shoulder the equivalent of the shoulder $n$ of the recess.

For certain classes of work the under surface of the welt-recess may be straight from one end to the other, and the templets are represented as so shaped in the drawings; but for many classes of work it is desirable to curve the under surface of the welt-recess to cause it to correspond to the surface of the last or form upon which the boot or shoe is nailed and to the ultimate shape or form which it is desired the boot or shoe shall have.

Having thus fully described my invention, I claim and desire to secure by Letters Patent of the United States—

1. In a heel-nailing machine, the combination of a last or work-support with a support or frame, C, carrying a templet, B, a plate, E, and the movable nail-carrying plate G, and a reciprocating gang of drivers, F, all substantially as described.

2. The combination of the reciprocating head D, the support C, vertically movable in relation to the head D, and plates B E, carried by said support C, the sliding nail-carrier G, and the gang of drivers F, all substantially as described.

3. The combination of the head D, the support or frame C, vertically movable in relation to the head D, the templet-plate B, and plate E, the drivers F, the sliding nail-carrier plate G, arranged between the plates B and E, and the nail-holder H, all substantially as described.

4. The combination of the perforated plates B E, the sliding nail-holder G, arranged between said plates, and the hole-covering plate $g'$, all substantially as described.

5. The combination of the plates B E, the nail-carrier plate G, arranged between them, as described, the plate $g'$, having a projection, $h^5$, and the spring-pin M, all substantially as described.

6. The combination of the templet B, the nail-carrier G, the nail-holder H, arranged upon a line with the templet when the templet is in its normal position, and the support or plate $h^4$, substantially as described.

7. The templet B, having a welt or rand holding recess, N, all substantially as described.

8. A templet having the welt or rand holding recess, N formed by a vertical or substantially vertical surface, $n$, and the surface $n'$, all substantially as described.

9. A templet, B, having a rand or welt holding recess, N, and the holes $b'$, arranged in relation thereto, as specified, all substantially as described.

10. A templet, B, having the recess N, in combination with the slides or plates O, substantially as described.

11. The combination of the templet B, the recess N, the slides or plates O, and devices for automatically withdrawing the slides during the operation of nailing, substantially as described.

12. The combination of the templet B, having the recess N, the slides O, and the reciprocating slide-operating rods $o^3$, substantially as described.

13. A templet, in combination with one or more welt or rand holding slides, constructed and arranged to operate substantially as described.

14. The slides or plates O for holding a welt or rand to the surface of the templet, substantially as described.

FREEBORN F. RAYMOND, 2D.

Witnesses:
   J. M. DOLAN,
   FRED. B. DOLAN.